Oct. 29, 1963   S. H. KAPLAN   3,109,117
COLOR REPRODUCING CATHODE-RAY TUBE
Filed May 22, 1961   3 Sheets-Sheet 1
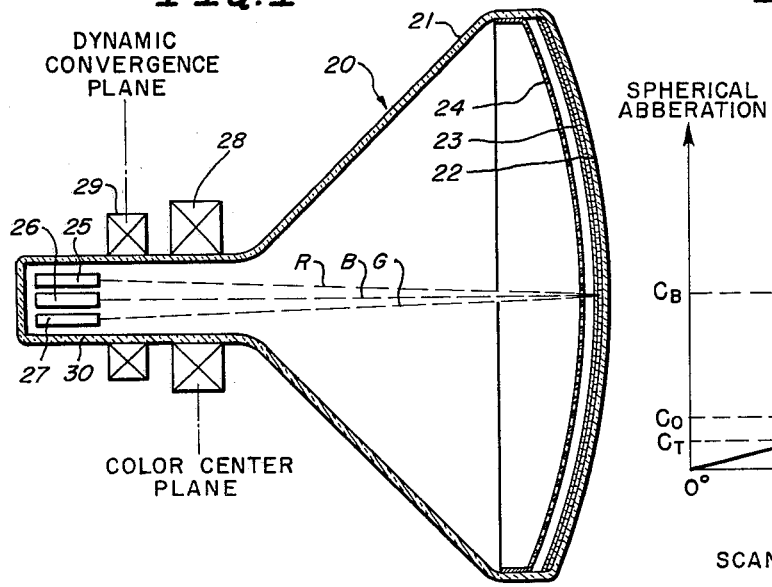
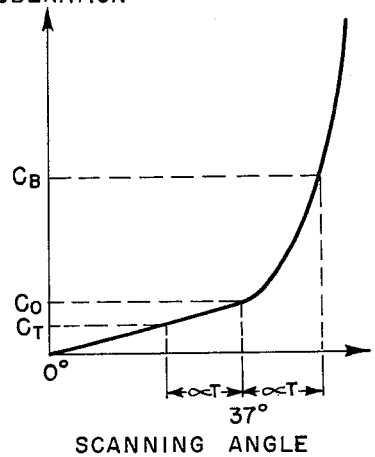
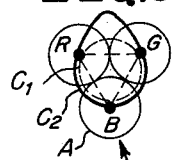
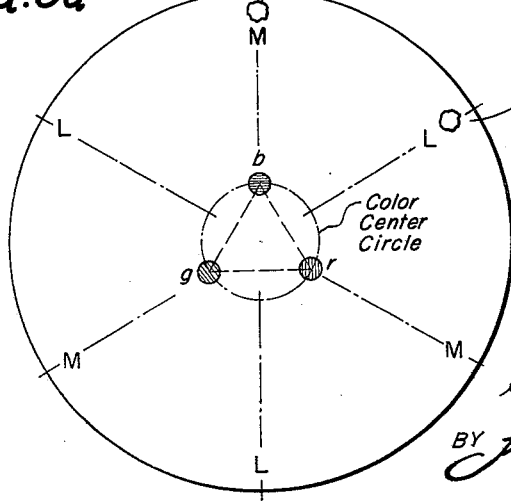
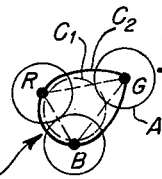

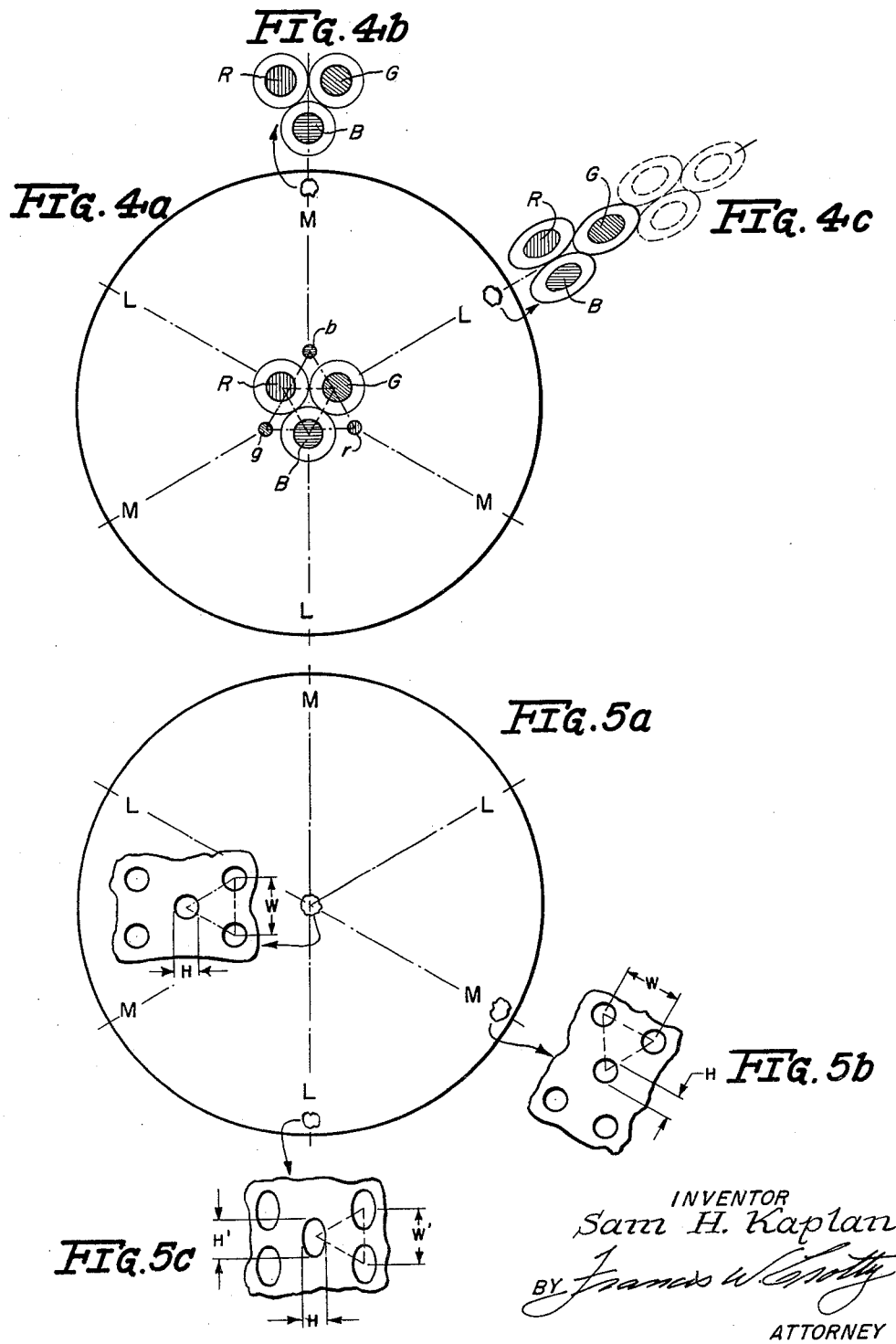

Oct. 29, 1963 S. H. KAPLAN 3,109,117
COLOR REPRODUCING CATHODE-RAY TUBE
Filed May 22, 1961 3 Sheets-Sheet 3
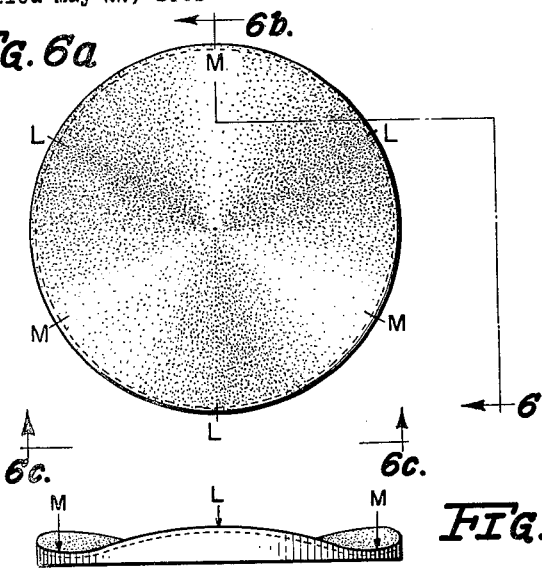
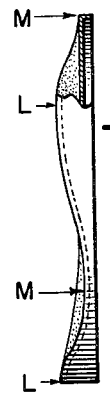
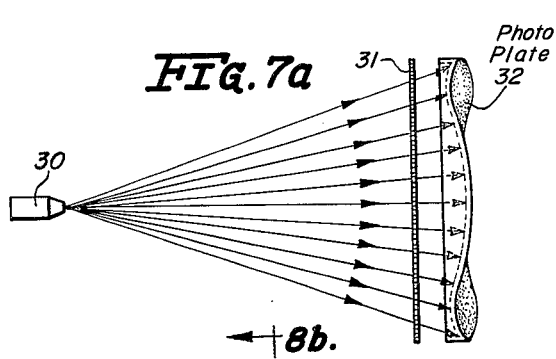
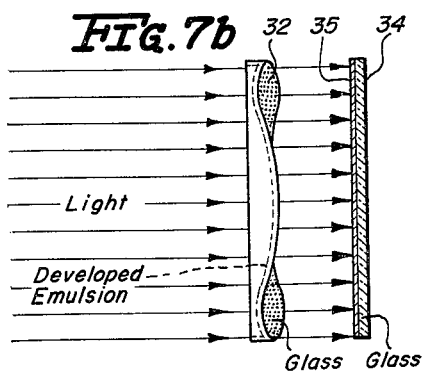
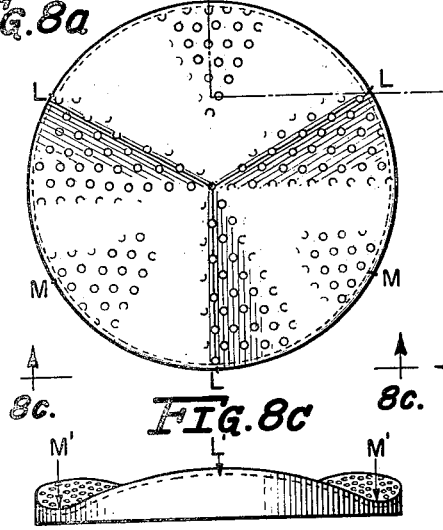
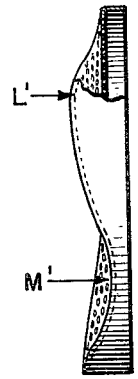
INVENTOR
Sam H. Kaplan
BY
ATTORNEY 3,109,117
COLOR REPRODUCING CATHODE-RAY TUBE
Sam H. Kaplan, Chicago, Ill., assignor to The Rauland Corporation, a corporation of Illinois
Filed May 22, 1961, Ser. No. 111,563
15 Claims. (Cl. 313—92)

The present invention relates to cathode-ray tubes for producing images in simulated natural color and, while of general application, is of particular interest to that type of cathode-ray tube which makes use of a color selection electrode in conjunction with an image screen having interspersed groups of phosphor elements which emit light of different colors. Perhaps the best known form is the so-called shadow mask or parallax device.

The image screen for one form of parallax tube has a plurality of similar groups of phosphor elements interspersed with one another to define a multiplicity of elemental multi-color areas. Where the phosphor elements take the form of dots, the elemental multi-color area, at least for the three color reproducer is generally referred to as a phopshor triad. Ideally, the red, blue and green phosphor elements of each such triad constitute a fair approximation of an equilateral triangle, when the electron beams are positioned in a triangle.

An electron gun assembly produces a plurality of electron beam components corresponding in number to the number of primary colors employed in the system, three for the case under consideration. A color selection electrode or aperture mask is interposed between the beam source and the image screen and the apertures thereof are arranged in a pattern that is very similar to the pattern of phosphor triads on the screen. The projection of electron beams through the color selection electrode results in any single beam impinging only upon the phosphor elements of a particular one of the three primary colors. Image reproduction is accomplished by scanning the several beam components across the screen and the brightness of the image is, of course, dependent upon the registration of the electron beams with the triad elements. Their registration is so important that lack of such registration between beams and triad elements causes color errors in the reproduced image.

Many difficulties are encountered in maintaining the optimum landing, as it is called, of the electron beams on the individual phosphor elements when viewed on the basis of the entire raster. In examining the difficulties of the problem, it is customary to assume that the electron beams originate from a so-called color center or deflection plane which is a plane transverse of the tube axis in the immediate vicinity of the deflection yoke. Actually, however, it has been discovered that the apparent source of the beam is not fixed or confined to a single plane but instead varies with deflection angle and appears to move in the direction of the screen as the angle of deflection is increased. This apparent movement of the beam source, oftentimes referred to as the center of deflection error, causes inaccurate registration or landing of the electron beams and introduces what has come to be known as triad location error.

It has also been found that the conjoint effect of dynamic convergence fields, needed to cause interimage registration, and certain magnetic fringe fields in the tube tend to displace the electron beams toward the outer edges of the phosphor triads by an amount which increases with the distance of the triad from the tube axis. Expressed differently, the three beams may be thought of as constituting a beam triad and the field effects in question undesirably change the size of the beam triad, increasing it with increased distance of the triad from the tube axis. This adversely influences brightness and the error which it introduces is called triad size error.

A detailed description of these two errors and means for correcting them is set forth in applicant's copending application entitled "Optical Correction in the Manufacture of Color Image Reproducers," filed October 26, 1956, Serial No. 618,590 and assigned to the same assignee as the present invention, now patent 3,003,874 issued October 10, 1961. There is a further disclosure of these errors and their correction in an article entitled "Error Correction in Mask Type Colour Television Tubes" published in the Journal of the Television Society, Volume 8, No. 11 (1958) at pages 470–480.

Still another error, designated triad shape error, arises from the fact that the image screens in color tubes of the type under consideration are spherical segments rather than being planar. The triad shape error is produced by a geometrical compression of both the beam triad and the phosphor triads with radial distance from the tube axis. The cause of this error is the foreshortening in the radial direction of the color center spacings as "seen" by the screen, where "color center spacings" denotes the spacings of the three electron beams in the color-center plane. Correction for triad shape error may be effected by a predetermined distortion of the apertures in the mask, whereby the apertures closer to the edge of the screen are made of slightly elliptical configuration The small axis of the ellipse is made shorter as a function of the location of the aperture from the tube axis. A detailed description of this third error and its correction is contained in the above mentioned article and in U.S. Patent No. 2,947,899 assigned to the assignee of the present invention.

A still further error, referred to hereinafter as "azimuth error," has been discovered in observations made in conjunction with correction for triad size errors. The azimuth error is a distortion of both the phosphor and the beam triads more pronounced at the outer periphery of the scan raster and especially noticeable in tubes having large deflection angles of the order of 90° or more. It has been found that the error varies periodically as a function of the azimuth angle which, in this context, refers to angular displacement along the periphery of a circle in terms of a reference; for example, the vertical ordinate may be considered as zero degrees of azimuth.

In order to produce high quality color tubes even though they may employ scan angles of 90° or more, it is important to correct the several errors discussed above including the azimuth error which manifests itself most markedly with increased scan angle.

Accordingly, it is an object of the present invention to provide a color cathode-ray tube having more complete freedom from errors and distortions than prior structures.

It is a particular object of the invention to permit the construction of color cathode-ray tubes of large scan angle which do not suffer impairment in the quality of the reproduced image attributable to the type of errors referred to above.

Another object of the invention is to provide a new screen and/or color selection electrode for a color cathode-ray tube which minimizes azimuthal and similar errors of prior structures.

A particular object of the invention is to eliminate the undesirable effects of azimuth error in the production and use of color reproducing cathode-ray tubes.

One aspect of the present invention contemplates a compensated image screen for a color reproducing cathode-ray tube. The screen has a plurality of similar groups of phosphor elements interspersed with one another with corresponding elements of each of the groups defining an elemental multi-color area, such as a triad. The elements constituting at least one, and preferably a number, of the multi-color areas are elongated in a radial direction extending from the central portion of the screen through these particular multi-color areas.

Another aspect of the invention provides a compensated aperture mask structure for a color tube having a plurality of apertures with the spacing and dimension of certain of the apertures elongated along radial directions extending from the central portion of the mask through these certain apertures, respectively.

A color reproducing cathode-ray tube embodying the invention comprises an image screen having a plurality of similar groups of phosphor elements interspersed with one another to constitute a multiplicity of elemental multi-color areas of a predetermined configuration and individually including a phosphor element from each of the groups. The dimension of the multi-color areas in a radial direction varies as a function of azimuth at least along the outer periphery of the screen. A color selection electrode is in juxtaposition with the screen and has a multiplicity of apertures formed therein. An electron gun means projects a corresponding plurality of beam components, arranged in a pattern having a like configuration to the pattern of the aforesaid elemental multi-color areas. The beams are projected through the color selection electrode to the screen and are responsive to deflection fields to scan the screen. The configuration of the beam pattern, however, is concurrently subject to a distortion which varies as a function of azimuth at least during the scanning of the periphery of the screen and a characteristic dimension of at least the screen or color selection electrode is similarly varied as a function of azimuth to compensate for the distortion of the beam pattern. Examples of the dimension which is varied to effect this compensation are radial length of certain of the mask apertures, undulations in the surface of the color selection electrode or the corresponding surface of the image screen which is actually scanned by the beam pattern.

The foregoing and other objects of the invention, together with further advantages and benefits thereof, will be more clearly understood from the following description of a particular embodiment thereof taken in conjunction with the annexed drawings in the several figures of which like components are designated by similar reference characters and in which:

FIGURE 1 is a schematic representation of a tri-color cathode-ray image reproducing device;

FIGURE 2 is a plot of spherical aberration versus scanning angle;

FIGURE 3a is a schematic representation of an image screen and FIGURES 3b and 3c are enlargements of certain peripheral portions thereof;

FIGURES 4a, 4b and 4c are similar representations of an azimuth-error corrected image screen;

FIGURES 5a, 5b and 5c are corresponding representations of an azimuth-error corrected apertue mask;

FIGURE 6a is a plan view of a formed plate utilized in constructing the aperture mask of FIGURE 5;

FIGURES 6b and 6c are sectional views taken as indicated by section lines 6b—6b and 6c—6c in FIGURE 6a;

FIGURES 7a and 7b are schematic representations of optical systems employed in the development of the aperture mask of FIGURE 5;

FIGURE 8a represents a modified form of azimuth-error corrected aperture mask, while FIGURES 8b and 8c are views taken as indicated by section lines 8b—8b and 8c—8c in FIGURE 8a.

Referring now more particularly to FIGURE 1, the color reproducing cathode-ray tube 20 there repesented compises an enclosing envelope 21 of metal or glass having a face plate 22 at the enlarged end and a reduced diameter neck section 30 at the opposite end. Enclosed within the tube is an image screen 23 which has a plurality of similar groups of phosphor elements interspersed with one another to constitute a multiplicity of elemental multi-color areas of predetermined configuration and individually including a phosphor element from each of the phosphor groups. While color reproduction may be accomplished with a variety of color components, say two, three or four different colors, it is convenient to continue this description on the basis of the tri-color system. The elemental multi-color areas of the screen may be referred to as phosphor triads each of which has a red, a green and a blue phosphor element. Also, the elements of the triad may have a variety of shapes but it will be convenient to consider that they are circular or dot-like elements. As will be made more clear hereinafter, the dimensions of the triads are significant to accomplish azimuth-error correction but suffice it at this juncture to state that the triads are disposed in a particular pattern throughout screen surface 23.

A color selection electrode 24 is included within the envelope in juxtaposition with the screen and has a multiplicity of apertures related in configuration to the phosphor triads. Where the triads are formed of phosphor dots, it is appropriate that the apertures of the mask be essentially circular. As with the screen, however, certain portions of the mask may, in practicing one form of the invention, have other specific shapes which will be discussed subsequently. In any event, the aperture pattern of the mask has such correspondence to the triad pattern of the screen that the mask may accomplish its known function of color selection.

There are electron gun means included within envelope 21 for projecting a plurality of beam components through color selection electrode 24 to screen 23. For a three color system, there may be provided three electron guns for producing three beams or a single gun may be used in conjunction with a deflection system for changing, from time to time, the beam path to simulate three electron beams. For convenience in this explanation it will be assumed that three beams are actually produced by three guns shown schematically at 25, 26 and 27. The beams are designated R, B and G. The three beams are responsive to deflection fields to scan screen 23. Usually, both horizontal and vertical deflection fields are produced in a deflection yoke designated 28. The vertical construction line extending across the tube axis centrally of yoke 28 is considered the color center plane of the tube which may be thought of as the source or location of the beams in examining the effects of scanning and the precision of registration of coincidence of beam landings on phosphor elements. A convergence assembly 29 is also provided to effect dynamic convergence of the electron beams so as to cause the three color images to be in point-by-point registration at the screen. Since the invention is concerned most particularly with correction of azimuth error, which has to do with the details of screen 23 and aperture mask 24, the other usual elements of the tube have been omitted from the drawings for purposes of simplification. They are, of course, well known to those skilled in the art.

The operation of the tube as thus far described is conventional. A brightness or luminance signal is applied from a receiver (not shown) in common to the three electron guns to intensity modulate each of the beams in accordance with detailed video information. At the same time, chroma or color signals, of the red, blue and green color fields, are derived in a chroma channel (not shown) and applied to the guns assigned to the red, blue and green color phosphors respectively to control both the hue and saturation of the three color components. The concurrent modulation in response to brightness and chroma information, in conjunction with beam scanning under the influence of horizontal and vertical sweep signals delivered to yoke 28 from a conventional sweep signal source (not shown), is reflected by excitation of the elements of the multiplicity of triads constituting screen 23. An observer upon viewing the screen directly effects a superposition of the three color fields and obtains the sensation of image reproduction in simulated natural color. Without considering this operation further, attention will be directed to the source of and correction for azimuth error.

In the introduction to the specification mention is made of the triad location error encountered in shadow mask tubes and compensated by the use of a suitably designed optical lens in the photographic process of laying down the phosphor dots on the screen. The curve of FIGURE 2 shows the spherical aberration or the dot placement correction in a radial direction to be accomplished by the lens in order to achieve proper beam landing throughout the scan raster. It is apparent from this curve that the spherical aberration of the lens and consequently the dot displacement changes in a sharply non-linear fashion with the angle of scanning beam incidence. In interpreting the graph, for example, the ordinate $C_0$ is the measure of dot displacement correction for a scan angle of 37° to correct the center of deflection error which, as explained above, is the shift of apparent beam source with scanning angle. This of course is premised on the use of a correcting lens disposed at right angles to the tube axis. Where the lens is tilted, say by an angle $\alpha_T$ with respect to the axis to accomplish compensation for such added difficulties as triad size error, two different corrections are occasioned on opposite sides of the tube axis. One correction $C_T$ corresponds to the effective angle of $(37° - \alpha_T)$ on the one side of the axis. The other correction $C_B$, on the opposite side of the tube axis, results from the effective angle of $(37° + \alpha_T)$. These differences are manifest in an enlargement of the optic triad otherwise arrived at in correcting for triad size error. Because of the distinctly non-linear shape of the characteristic curve of FIGURE 2, the enlargement of the optic triad is unequal on opposite sides of the tube axis which introduces an azimuth error in conjunction with the threefold symmetry of the color centers.

A physical concept of the phenomenon may be obtained from the representation of FIGURE 3a where the large circular outline may be considered to be the periphery of the image screen while the smaller circular outline designated color center circle is a construction at the color center plane of a circle embodying the apparent sources of the red, blue and green beams. Were there no azimuth error, the parallactic projection of the color center circle on the screen would be undistorted as shown by the circle $C_1$ in FIGURE 3b which is an enlargement of a peripheral portion of the screen in alignment with the source B of the blue beam and on the same side of the tube axis which, of course, is at the center of the color circle. Actually, however, the non-linearity referred in discussing the curve of FIGURE 2 distorts the projected image of the color center circle into the egg-shaped curve $C_2$ of FIGURE 3b especially when a lens which corrects for dynamic convergence is used. If the centers of the three dots of the particular phosphor triad under observation fall on the undistorted portion of curve $C_2$, that particular triad suffers no discernible azimuth error as is apparent in FIGURE 3b wherein the dots have their usual tangential relation to one another. Since the three guns are symmetrically positioned in respect of the tube axis, there are three such locations where peripheral segments of the screen suffer no appreciable azimuth error. These locations are designated by the letter M and each is in radial alignment with and on the same side of the tube axis as one of the apparent beam sources B, R and G.

Midway of any two such sections M the azimuth error is a maximum because the center of one of the dots, referred to as the apex dot A, falls on the tip or most distorted portion of curve $C_2$ as illustrated in FIGURE 3c, an enlargement of another peripheral section L of the screen. The effect is a displacement of the dot radially outwardly from the other elements of its triad. Because of the tube symmetry there are again three such peripheral segments and they are designated L. The azimuth error, therefore, as reflected in the optical triads is a minimum at the points M and maximum at the points L and varies as a function of the azimuth angle from minimum to maximum and back to minimum around the periphery of the screen. This variation is approximately sinusoidal.

The angular location of the points of minimum and maximum azimuth error is determined by the orientation of the (color triangular) R, G and B beams; as illustrated in FIGURE 3a, the points of least error occur at 0, 120 and 240 degrees of azimuth while the occurrence of maximum azimuth error is at 60, 180 and 300 degrees of azimuth. From the configuration of the distorted and projected color center circle, represented by curve $C_2$, this may be likened to a coma type aberration in that the distortion is essentially pear shaped.

The discussion of FIGURES 2 and 3 shows the derivation of azimuth error in the phosphor triads because FIGURES 3b and 3c illustrate the triad arrangements in the face of uncorrected azimuth error. It may also be shown that an azimuth error, similar in the type of distortion it causes and in its occurrence in terms of degrees of azimuth, is introduced into the beam triad, remembering that the three beams are arranged in a geometrical pattern which is similar to the phosphor dot triads. In the case of the beam triad, the azimuth error results mainly from fringe field effects and the net result is that as the beam scans the image raster, especially the peripheral portion thereof, it is subject to a pattern distortion which also varies as a function of azimuth in a generally similar manner to the phosphor triad distortion attributable to azimuth error.

This azimuth variation, present in both the phosphor triads and the electron beam triad, causes a color error since the displaced phosphor area, dot A, and the displaced electron beam fall onto portions of the next outermost triad and generate improper colors.

Having thus established the cause and manifestation of azimuth error, both for the phosphor triads and the beam triad, corrective steps for minimizing such errors will now be considered.

Efforts to make allowance or accommodation for the azimuth error distortion by modification of the size of the phosphor dots are not fruitful. In the first place, reduction in dot size adversely effects brightness as to those areas of the screen, such as that indicated in FIGURE 3b, where there is no need for correction. Additionally, it is not practical to resort to modification of the dot size for only such of the triads as represented in FIGURE 3c that are in real need of correction. The more appropriate solution rests in a novel screen and mask construction of the type indicated in FIGURE 4.

The phosphor triads are essentially equilateral in the center of the screen as indicated. This is also true for triads, even those located near the periphery of the screen, positioned along azimuth lines of predetermined equiangular separation, a separation of 120 degrees for the triad color tube under consideration. These are the triads at the sections of the screen designated M which are along 0, 120 and 240 degrees of azimuth and an enlargement thereof is represented in FIGURE 4b. (NOTE: to avoid confusion in the drawing and in the description only distortions reflecting azimuth error, none others, are taken into account in FIGURE 4 and in its discussion.)

The phosphor triads near the periphery of the screen but disposed along azimuth lines midway between the screen portions M have a maximum elongation radially outwardly at their azimuth position. Again, for the three color tube, these are along the lines of 60, 180 and 300 degrees of azimuth designated L. FIGURE 4c is an enlarged representation of the elongated triad at such sections.

The cross hatched areas of FIGURE 4c represent the landing area of the three beams superposed on similar elliptically shaped phosphor elements, representing a radial stretching or distortion of elements initially having a generally circular configuration. The dot-dash triangle $b$, $g$, $r$ shows the location of the three electron beams in the color center plane. The triangle formed by the broken construction lines within the triad shows the general configuration of the triad; how it has been distorted at peripheral sections L radially outwardly from the equilateral configuration of the dot triads in the center of the screen.

Further out on the same radius there is shown in broken construction line another phosphor dot triad. The representation illustrates that the desired tangential or touching geometry of contiguous phosphor triads is maintained.

The radial elongation which is a maximum at the periphery of the screen, as explained, decreases to zero for triads on the same degree of azimuth but positioned progressively closer to the center of the screen.

Specific mention has been made of the two extremes: screen sections M where the triads suffer least perceptible azimuth error and have nearly equilateral configuration and intermediate screen sections L which are subject to maximum azimuth error and where there is maximum radial distortion in the outward direction of the triads. Between these extremes, the triads at least along the periphery of the screen change uniformly from that at screen section M to that at section L. This is a cyclic or repetitive change in phosphor triad configuration, changing progressively between maximum and minimum in every 60 degrees of azimuth. The type variation approximates that of a sinusoid although it is not convenient to express the variation in a mathematical expression as a function of azimuth, since there are a great many variables to be taken into consideration. It is most easily determined empirically.

In fabricating a screen of the type shown in FIGURE 4, an azimuth corrected apertured mask is first constructed, in a manner to be described hereinafter, and this is used in any of the well known photographic processes for laying down a triad type multi-color screen.

Complete azimuth-error compensation entails not only correction for the phosphor dot triads but also for the disortion of the beam triad which, as explained above, may be shown to be essentially the same type of coma aberration to which the phosphor dot triads are subjected. An azimuth corrected aperture mask is represented in FIGURE 5. At the central portion of the screen and those portions occurring at 0, 120 and 240 degrees of azimuth, corresponding to the M sections of the image screen of FIGURE 4, the holes in the mask are formed in the usual way. Their confirmation is conventional as is true of the confirmation of the phosphor triads of the M portions of the screen which are scanned through these apertures of the mask. If they deviate from the ideal confirmation, it is only to adjust and compensate for other errors resulting from the influence of aberrations or non-linearities of the system which are of no particular concern in the discussion of azimuth-error correction and will not be considered further.

However, for those apertures near the periphery of the mask and located at azimuth positions of a predetermined equiangular separation, specifically at 60, 180 and 300 degrees of azimuth for the tri-color tube being considered, both the separation and the length of the apertures have a maximum elongation in a radial direction as shown in the enlarged view of FIGURE 5c. Their elongation is manifest from a comparison of this figure to FIGURE 5b, an enlargement of the peripheral screen section M.

Both at the central portion of the mask and at the sections M thereof the apertures are generally circular and have a diameter H and a separation in a radial direction W. At the sections L, the radial length H' of the aperture, for a representative 90 degree tube, is increased approximately 20% and the separation W' of successive apertures located on the same radius and near the periphery is increased by essentially the same percent. It is most convenient to determine the exact amount of this change in dimension empirically.

Between screen sections M and L which repeat regularly around the periphery of the screen, the elongation and separation of the apertures vary uniformly from a minimum at screen sections M to a maximum at sections L.

Particular attention has been directed to the distortion encountered at the periphery of the screen because there the azimuth error is most pronounced. At any azimuth position, such as the representative 60, 180 and 300 degrees of azimuth where the distortion is found, it decreases progressively toward the center of the screen. For this reason, the radial extension or distortion of the apertures in the mask as well as their radial distance decreases from a maximum at the periphery to a minimum at the center where the radial dimension and spacing of the apertures is the same as that for apertures on the 0, 120 and 240 degrees of azimuth.

An appreciation of the change in spacing and the dimension of the apertures, along the positions of azimuth heretofore referred to as the location of the L sections of the mask, can be obtained if one visualizes the aperture mask as the perforated mask of extendible material such as rubber. Consider that the mask is held fixed by its center and is pulled radially outwardly along the radial lines at azimuth L sections of the mask. The resulting stretching along the radius, of both the radial dimension of the apertures and the separation of successive apertures, is similar to the arrangement of apertures in the mask of FIGURE 5.

The construction of an azimuth corrected mask will be described in connection with FIGURES 6 and 7.

The first step in the preparation of the azimuth-error corrected aperture mask is the formation of a suitable metallic blank into the configuration disclosed in FIGURE 6. The blank, which initially is flat or entirely planar, is formed by a sagging process to have a scallop-like surface with a rise or maximum distention at the 60, 180 and 300 degrees azimuth positions and a zero distention at the 0, 120 and 240 degrees azimuth positions. The contour preferably is a uniform and essentially a sinusoid variation between each minimum to maximum point of distention.

This variation between minima and maxima occurs at the periphery of the blank and the variation also extends in a radial direction from zero at the center to a maximum at the periphery. Some appreciation or appearance of the scalloped blank may be derived by visualizing the surface as having conical type deformations with a maximum distention or deformation occurring on the periphery at the 60, 180 and 300 degrees of azimuth and dropping off uniformly therefrom both radially and peripherally to zero at the center and to zero at the 0, 120 and 240 degrees of azimuth.

The scalloped plate of FIGURE 6 is used as a pattern for making a glass or other transparent photoplate of the same configuration. The formed photoplate 32 is then coated with a suitable emulsion 33 and arranged in an optical system as indicated in FIGURE 7a. This system employs known photographic techniques for forming the azimuth-error corrected aperture mask. A light source 30 is positioned to simulate the center of the plane of color centers and projects light through a pattern 31 onto photoplate 32.

The pattern 31 is the usual form of planar aperture mask from which spherically shaped masks as actually used, are made by stamping, with the apertures formed, as to dimension, spacing and configuration to accomplish correction for the triad shape error, as explained in the above mentioned publication, patent and application.

It is clear that the light admitted by the apertures of mask 31 to fall on the surface of the photoplate 32 at a location of maximum curvature results in a developed area of maximum length, whereas light striking relatively flat portions of the photoplate produces developed areas of minimum dimension. In like fashion, the blocking effect of the imperforate areas of mask 31 is greatest as to areas of plate 32 having maximum curvature, but is least as to the flat portions of the plate 32. Consequently, the scalloped configuration of the photoplate permits the development of areas which vary both in radial dimension and radial separation in the required manner to satisfy the aperture pattern of the mask of FIGURE 5.

An aperture-pattern image, constructed as described, on photoplate 32 of FIGURE 7a is then positioned in the manner shown in FIGURE 7b in a field of collimated light, that is to say, light traversing uniform and parallel paths which project the image pattern from photoplate 32 upon another transparent member 34 having a coating 35 of light-sensitive emulsion. This accomplishes photographic transfer of the aperture pattern from plate 32 to plate 34 which has a planar configuration. Element 34 is now a master azimuth-error corrected aperture plate from which duplicate masks can be made in conventional fashion. These planar masks are then stamped or drawn into spherical masks in a manner well known in the art.

In the preferred form of the present invention, correction for azimuth error is accomplished through the use of master aperture mask 34 in the reproduction of other and similar aperture masks for incorporation into color cathode-ray tubes and also for use in laying down the pattern of phosphor triads in a photographic process in which light is projected onto a photo-sensitive emulsion through the azimuth-error corrected aperture mask. It is common practice to take a particular mask intended for a particular tube and use it in establishing the triad pattern for the multi-color screen to be incorporated in that same tube. The techniques of constructing phosphor triads through photographic transfer processes are well known in the art and need not be repeated herein. After the fabrication of the screen, the incorporation of that screen with the aperture mask through which the screen has been developed permits the construction of an azimuth-corrected color reproducing cathode-ray tube in accordance with the invention.

Another approach to the correction of azimuth error makes use of the mask construction of FIGURE 8. This aperture mask differs from the usual mask, such as mask 31 referred to in the discussion of FIGURE 7a, not in the dimensioning and spacing of the apertures but rather in the surface configuration. The mask in FIGURE 8 has a scalloped surface similar to that described in conjunction with the formed photoplate of FIGURE 6a. The surface presented to the circle of color centers is undulating with maximum deformation at the 60, 180 and 300 degrees of azimuth. The deformation then diminishes gradually in both peripheral directions to zero at the 0, 120 and 240 degrees of azimuth and also to zero at the center of the mask area. Scanning of the image screen of FIGURE 4 through an apertured mask having this configuration provides some of the desired registration correction of beam landing in respect of phosphor dots as obtainable with the mask structure of FIGURE 5. In short, the mask structure of FIGURE 8 has the characteristic of effectively modifying the aperture mask-screen spacing as a function of azimuth to correct for azimuth error.

The same type of approach, forming undulations in a scanned surface to vary effective scanning angle as a function of azimuth, may also be used in conjunction with the image screen. That is to say, one may achieve azimuth error correction through the use of the usual spherical type aperture mask in conjunction with the azimuth-error corrected screen of FIGURE 4 modified to have an undulating surface as described in connection with FIGURE 8. Obviously, since the use of an undulating surface is available for the aperture mask structure or the screen, it may be employed concurrently in each although the extent of deformation introduced into both the aperture mask and screen may be less than when utilized in only one or the other.

Generically speaking, correction for azimuth error in accordance with the teachings of the invention contemplates that a characteristic dimension of either the screen or the color selection electrode is varied as a function of azimuth. For the aperture mask of FIGURE 5, the variation is in both the radial length and radial spacing of the apertures. On the other hand, the mask structure of FIGURE 8 has a change in the surface of the mask from a spherical type surface to a scalloped surface. In like fashion, the surface of the image screen may be scalloped for azimuth error correction.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. For a color reproducing cathode-ray tube, an image screen comprising: a plurality of similar groups of phosphor elements interspersed with one another with corresponding elements of each of said groups defining an elemental multi-color area; and the elements constituting at least one of said multi-color areas being elongated in a radial direction extending from the central portion of the screen through the particular multi-color area.

2. For a color reproducing cathode-ray tube, an image screen corrected for azimuth error comprising: a plurality of similar groups of phosphor elements interspersed with one another with corresponding elements of each of said groups defining an elemental multi-color area; the elements of those of said multi-color areas located near the periphery of said screen on azimuth positions of predetermined equi-angular separation being elongated in a radially outward direction; and the elements of those of said multi-color areas located near the periphery of said screen but on azimuth positions midway between said first-mentioned azimuth positions having no substantial radial elongation.

3. For a color reproducing cathode-ray tube, an image screen corrected for azimuth error comprising: a plurality of similar groups of phosphor elements interspersed with one another with corresponding elements of each of said groups defining an elemental multi-color area; the elements of said multi-color areas near the periphery of said screen having a radial elongation that varies from a maximum for multi-color areas located along azimuth positions of predetermined equi-angular separation to a minimum for multi-color areas located along azimuth positions midway between said first-mentioned azimuth positions at the same radial distance.

4. For a tri-color reproducing cathode-ray tube, an image screen corrected for azimuth error comprising: three similar groups of phosphor elements interspersed with one another with corresponding elements of each of said groups defining an elemental multi-color triad area; the elements of said triad areas near the periphery of said screen having a radial elongation that varies from a maximum for triad areas located along azimuth positions having a separation from one another of 120 degrees to a minimum for triad areas located along azimuth positions midway between said first-mentioned azimuth positions.

5. For a color reproducing cathode-ray tube, an image screen corrected for azimuth error comprising: a plurality of similar groups of phosphor elements interspersed with one another with corresponding elements of each of said groups defining an elemental multi-color area; the elements of said multi-color areas near the periphery of said screen having a radial elongation that varies from a maximum for multi-color areas located along azimuth positions of predetermined equi-angular separation to a minimum for multi-color areas located along azimuth positions midway between said first-mentioned azimuth positions and the radial elongation of said areas decreasing from a maximum at the periphery of said screen to a minimum in the central portion of said screen.

6. For a color reproducing cathode-ray tube, an image screen corrected for azimuth error comprising: a plurality of similar groups of phosphor elements interspersed with one another with corresponding elements of each of said groups defining an elemental multi-color area; the elements of said multi-color areas near the periphery of said screen having a radial elongation that varies from a maximum for multi-color areas located along azimuth positions of predetermined equiangular separation to a minimum for multi-color areas located along azimuth positions midway between said first-mentioned azimuth positions and the surface of said screen having repeating scallop-like deformations of minimum deformation in the central portion of the screen rising along said first-mentioned azimuth positions to a maximum at the periphery of said screen.

7. For a color reproducing cathode-ray tube, an image screen having a plurality of similar groups of phosphor elements interspersed with one another and having a scalloped-like surface supporting said phosphor elements, with the scalloped portions thereof extending from the central area of the screen to the periphery thereof and having undulation peaks recurring regularly in a circular path about the periphery of said surface.

8. For a color reproducing cathode-ray tube, an aperture mask structure having a plurality of apertures with the separation and length of certain of the apertures effectively elongated with distance along radial directions extending from the central portion of the mask through said certain apertures, respectively.

9. For a color reproducing cathode-ray tube, an azimuth-error corrected aperture mask structure having a plurality of apertures with the radial separation and radial length of those of said apertures near the periphery of said mask on azimuth lines of a predetermined equi-angular separation being a maximum; and the radial separation and radial length of those of said apertures near the periphery of the screen but on azimuth positions midway between said first-mentioned azimuth positions being a minimum.

10. For a color reproducing cathode-ray tube, an azimuth-error corrected aperture mask structure having a plurality of apertures with the radial separation and radial length of those of said apertures on azimuth positions of a predetermined equi-angular separation varying from a minimum near the central portion of said mask to a maximum near the periphery thereof; and the radial separation and radial length of those of said apertures on azimuth positions midway between said first-mentioned azimuth positions being a minimum.

11. For a tri-color reproducing cathode-ray tube, an azimuth-error corrected aperture mask structure having a plurality of apertures with the radial separation and radial length of those of said apertures on azimuth positions having a separation of 120 degrees varying from a minimum near the central portion of said mask to a maximum near the periphery thereof; and the radial separation and radial length of those of said apertures on azimuth positions midway between said first-mentioned azimuth positions being a minimum.

12. For a color reproducing cathode-ray tube an aperture mask having a plurality of apertures and having a scalloped-like surface with the scalloped portions thereof extending from the central area of the mask to the periphery thereof and having undulation peaks recurring regularly in a circular path about the periphery of said surface.

13. A color reproducing cathode-ray tube comprising: an image screen having a plurality of similar groups of phosphor elements interspersed with one another to constitute a multiplicity of elemental multi-color areas of a predetermined configuration individually including a phosphor element from each of said groups, the dimension of said multi-color areas in a radial direction varying as a function of azimuth at least along the periphery of said screen; a color-selection electrode in juxtaposition with said screen having a multiplicity of apertures therein; electron-gun means for projecting a corresponding plurality of beam components, arranged in a pattern of like configuration, through said color-selection electrode to said screen, said beam components being responsive to deflection fields to scan said screen and the configuration of the beam pattern being concurrently subject to a distortion which varies as a function of azimuth at least during the scanning of said periphery of said screen; and a characteristic dimension of at least one of said screen and said color selection electrode being varied as a function of azimuth to compensate for said distortion of said beam pattern.

14. A color reproducing cathode-ray tube comprising: an image screen having a plurality of similar groups of phosphor elements interspersed with one another to constitute a multiplicity of elemental multi-color areas of a predetermined configuration individually including a phosphor element from each of said groups, the dimension of said multi-color areas in a radial direction varying as a function of azimuth at least along the periphery of said screen; a color-selection electrode in juxtaposition with said screen having a multiplicity of apertures therein; electron-gun means for projecting a corresponding plurality of beam components, arranged in a pattern of like configuration, through said color-selection electrode to said screen, said beam components being responsive to deflection fields to scan said screen and the configuration of the beam pattern being concurrently subject to a distortion which varies as a function of azimuth at least during the scanning of said periphery of said screen; and the dimension and separation of said apertures of said mask on azimuth positions of a predetermined equi-angular separation varying from a minimum at the central portion to a maximum at the periphery of said mask to compensate for said distortion of said beam pattern.

15. A tri-color reproducing cathode-ray tube comprising: an image screen having three similar groups of phosphor elements interspersed with one another to constitute a multiplicity of multi-color phosphor triads individually including a phosphor element from each of said groups, the dimension in a radial direction of those of said triads on certain azimuth lines having a separation of 120 degrees increasing from a minimum near the central portion of said screen to a maximum at the periphery thereof; a color-selection electrode in juxtaposition with said screen having a multiplicity of apertures therein; electron-gun means for projecting a corresponding plurality of beam components, arranged in a pattern of like configuration, through said color-selection electrode to said screen, said beam components being responsive to deflection fields to scan said screen and the configuration of the beam pattern being concurrently subject to a distortion which varies as a function of azimuth at least during the scanning of said periphery of said screen; and the dimension and separation of said apertures of said mask on said certain azimuth positions varying from a minimum at the central portion to a maximum at the periphery of said mask.

References Cited in the file of this patent

UNITED STATES PATENTS

| | | |
|---|---|---|
| 1,491,830 | Troeger | Apr. 29, 1924 |
| 2,755,402 | Morrell | July 17, 1956 |